Nov. 25, 1969 R. W. SANDERS 3,480,865

PHASE LOCKED CRYSTAL CONTROLLED VOLTAGE VARIABLE OSCILLATOR

Filed Sept. 27, 1965 2 Sheets-Sheet 1

INVENTOR.
RAY W. SANDERS
BY John E. Wagner
ATTORNEY

INVENTOR.
RAY W. SANDERS
BY John E. Wagner
ATTORNEY

United States Patent Office 3,480,865
Patented Nov. 25, 1969

3,480,865
PHASE LOCKED CRYSTAL CONTROLLED VOLTAGE VARIABLE OSCILLATOR

Ray W. Sanders, Los Angeles, Calif., assignor to Space-General Corporation, El Monte, Calif., a corporation of California Filed Sept. 27, 1965, Ser. No. 490,564
Int. Cl. H04b *1/16*
U.S. Cl. 325—419 4 Claims

ABSTRACT OF THE DISCLOSURE

This invention relates to radio telemetry receivers and more particularly to such receivers employing phase locked loop circuits to track radio frequency carrier waves of varying frequency, phase and amplitude.

Figure 1:
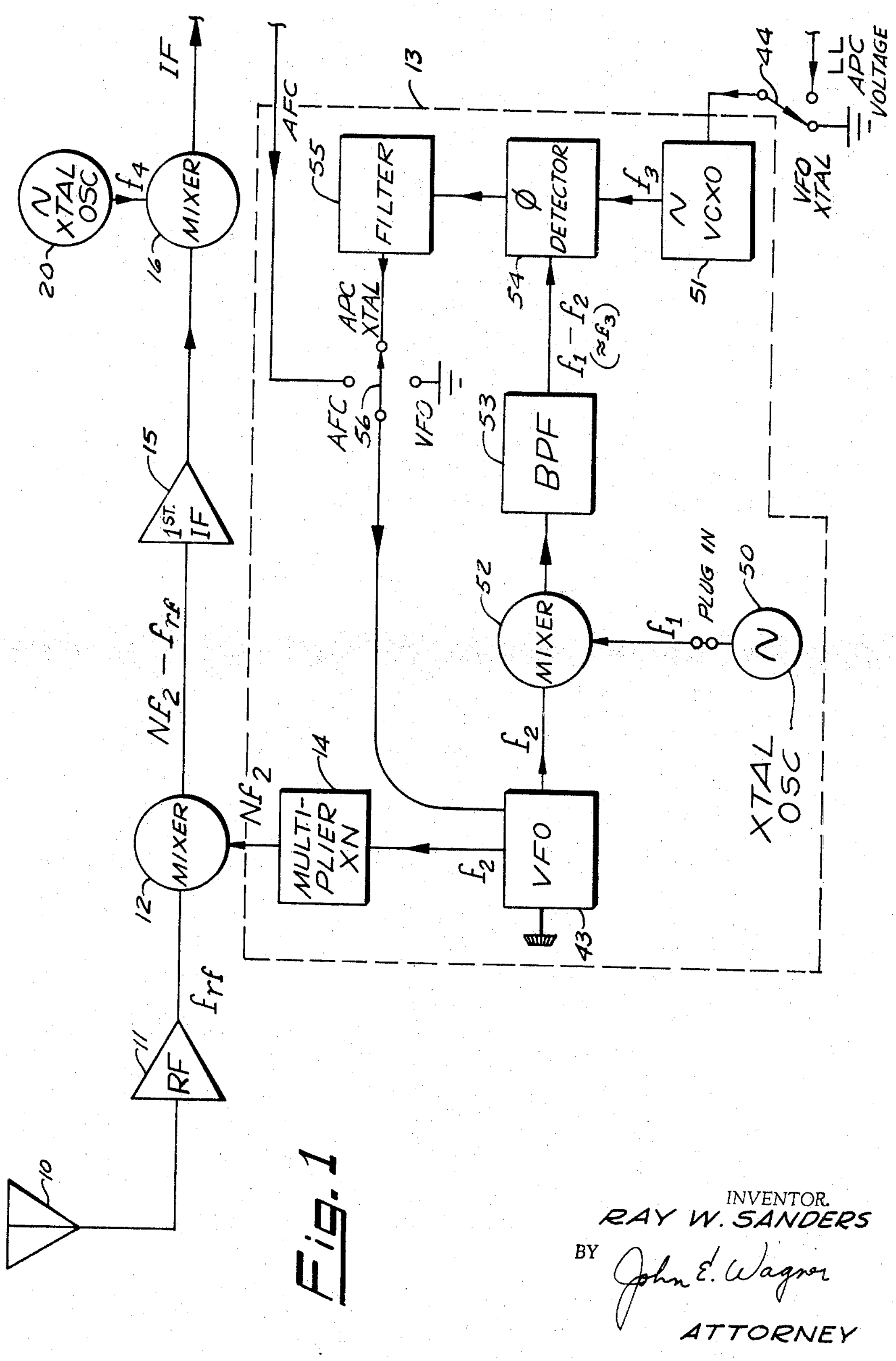

The disclosure shows an embodiment in the form of a superheterodyne radio receiver designed particularly for telemetry data reception. It includes a first local oscillator and the entire receiver through the intermediate frequency stages is connected in a phase locked loop circuit configuration with the first local oscillator.

The first local oscillator disclosed employs a variable frequency oscillator, a crystal controlled oscillator and a voltage controlled crystal oscillator.

Switching circuitry is included to allow the receiver to operate in a variety of modes for detecting frequency modulation, amplitude modulation, phase modulation signals, either with or without phase locked loop tracking.

In the design of telemetry receivers intended particularly for missile and satellite tracking, a very real need has heretofore existed for radio receivers which can reliably detect high frequency carrier waves subject to variations in signal strength and frequency due to interference, Doppler effects due to vehicle movement and other sources. Where a number of separate channels of information are simultaneously transmitted from a vehicle closely spaced in the frequency spectrum, it would appear desirable that the receiver be crystal controlled with the receiver frequency set at the carrier center frequency. Simple crystal controlled receivers have proved in practice to be unsatisfactory because the received carrier wave is often subject to Doppler shift beyond the narrow frequency response band of the receiver and information can be lost.

On the other hand, a conventional manually controlled receiver employing variable frequency oscillator allows for tuning to compensate for carrier frequency shifts, but operator response is insufficient for adequate tracking. With automatic frequency control, this latter problem is minimized but such receivers lack the inherent stability of crystal controlled receivers.

One other approach to the design of telemetry receivers employs the phase lock loop or tracking filter. One example of a phase locked receiver is the "Digilock" system receiver of the assignee of this invention and described in the Patent 3,030,614 issued Apr. 17, 1962, to F. W. Lehan, A. W. Newberry and myself. The historical background and basic fundamentals of phase lock loop systems is further described by A. J. Viterbi in chapter 8 of Space Communications, copyright 1963 by the McGraw-Hill Book Co., Inc., of New York.

Suffice it to say that phase lock loop receivers are effective to track relatively narrow band signals coherently in high noise environment. This is accomplished by applying the received radio frequency energy to a mixer or multiplier where it is mixed with the output of a local voltage controlled oscillator. The product of the mixed signals is passed through a low pass filter to derive the DC component of the product which is in turn applied to the frequency determining input of the VCO. In the case where frequency modulation is used and no Doppler shift is encountered, the DC component constitutes the wanted signal, i.e. a voltage proportional to the frequency deviation of the carrier wave from its assigned center frequency. Where the incoming signal includes Doppler shift, the DC component applied to the voltage controlled oscillator can be used to continuously tune the RF stage to track the carrier of the received signal.

The phase lock loop receiver has demonstrated its value in satellite and missile tracking systems as noted in the treatise cited above, however employing conventional voltage controlled oscillators of the LC or LR type, the operating frequency of the voltage controlled oscillator is a function not only of the DC control voltage applied thereto, but also the ambient temperature, changing component values, and other factors not completely within the control of the receiver manufacturer or user. In short, the phase lock receiver and the variable frequency oscillator receivers each lack the inherent frequency stability of the crystal controlled receiver.

With this general understanding of the state of the art in mind, it is a general object of this invention to improve telemetry receivers.

It is a further object of this invention to produce a telemetry receiver having the inherent stability normally associated with a crystal stabilized receiver.

A further object of this invention is to produce such a stable receiver which also exhibits the tracking capability of a phase locked loop receiver.

One further object of this invention is to produce such a receiver which further has the capability of manual variable frequency tuning while maintaining tracking capability and crystal stability.

Still another object of the invention is to produce such a receiver which is capable of simple crystal stabilized operation, phase locked loop operation, manual variable frequency controlled operation and long loop automatic phase controlled operation with a minimum of switching.

It is a further object of this invention to provide receivers capable of all of the above modes of operation over selected frequency ranges by the simple substitution of one crystal.

Basically, the invention involves a double conversion superheterodyne receiver with the first local oscillator comprising a phase locked loop circuit including a variable frequency oscillator, a crystal controlled reference oscillator and a second voltage controlled or "pulled" crystal oscillator. The first local oscillator by selective switching is operable with self-referenced phase or in long loop configuration with a phase reference derived from a second phase lock loop including the first and second IF stages of the receiver.

Figure 1A:
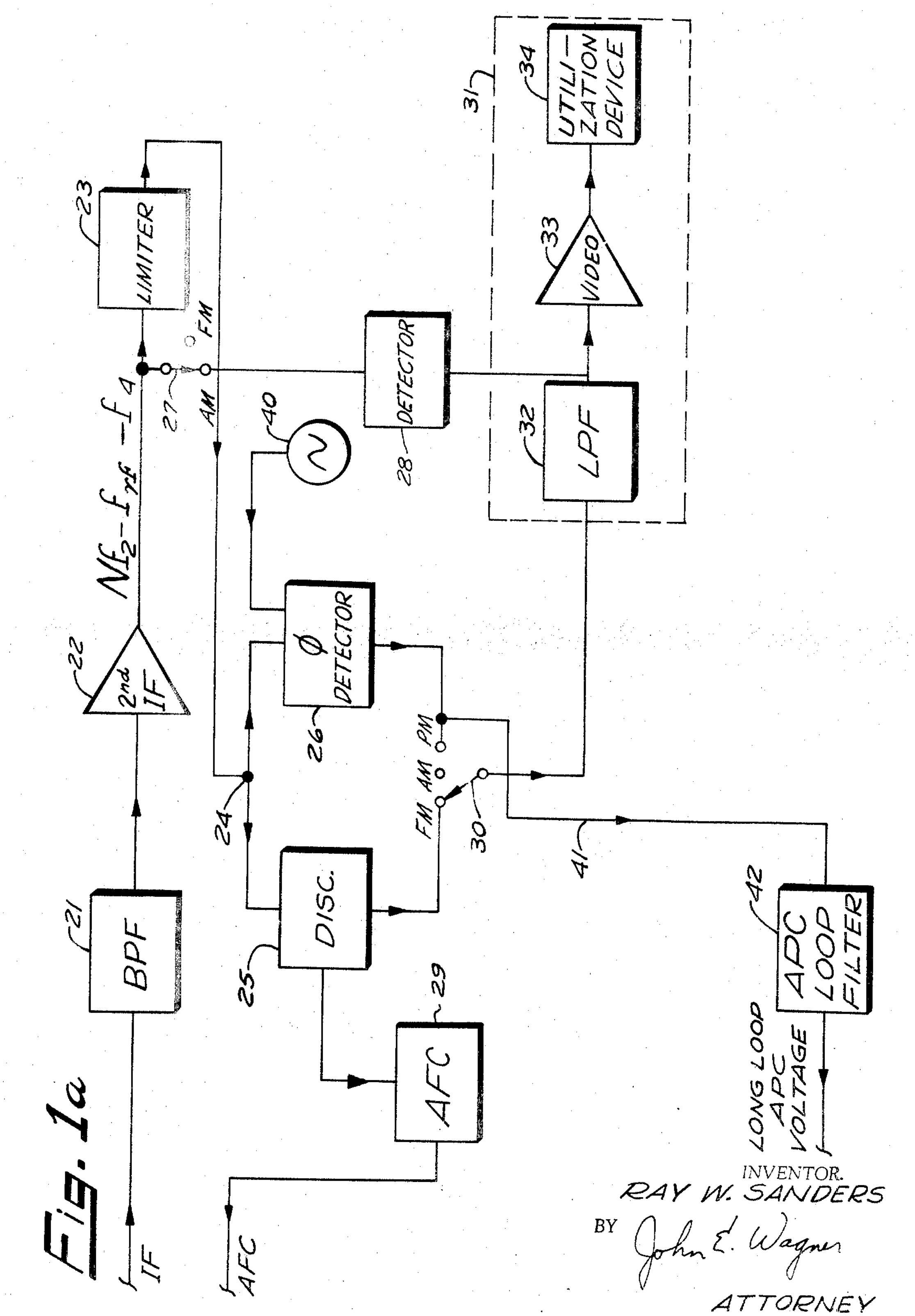

A more complete understanding of this invention and the manner of achieving the foregoing objects may be derived from the following description and by reference to the drawing in which FIG. 1 together with FIG. 1*a* constitutes a block diagram showing one embodiment of this invention.

Now referring to the drawing (FIGS. 1 and 1*a*) shows in block diagram form a double conversion superheterodyne radio receiver designed for use in telemetry systems employing various forms of modulation such as amplitude modulation (AM), frequency modulation (FM), phase modulation (PM) and pulse code modulation (PCM) and provides data outputs for a variety of devices such as a pen or tape recorder, load speaker or other type of utilization device.

The basic arrangement and operation of the receiver is best described in connection with its crystal controlled operation for a fixed narrow bandwidth single communications channel. The receiver is connected to an antenna 10 and includes a broad band radio frequency amplifier 11 which applies the amplified incoming signal designated in the drawing as frequency $f_{rf}$ to a mixer 12.

A locally generated signal $N_{f2}$ from the first local oscillator 13 is likewise applied to the mixer 12 to produce the first intermediate frequency $N_{f2}-f_{rf}$ which is typically centered at 30 mc. The first intermediate frequency $(N_{f2}-f_{rf})$ is amplified in IF amplifier 15 and converted down to the second intermediate frequency $N_{f2}-f_{rf}-f_4$ in a mixer 16 fed by a crystal oscillator 20 operating at reference frequency $f_4$. A typical frequency of the crystal oscillator 20 is 40 mc. thereby producing 2nd intermediate frequency $N_{f2}-f_{rf}-f_4$ nominally 10 mc. The second intermediate frequency is filtered in narrow band pass filter 21 and amplified in second IF amplifier 22, amplitude limited in limiter 23 and applied to a junction point 24 connected to both a discriminator 25 used for FM mode operation and a phase detector 26 for PM operation. A mode selector switch 30 alternately connects the phase detector 26 or the discriminator 25 to the output circuit 31 of the receiver. The output of the receiver may take any of a variety of forms depending upon the particular requirements for display or data usage. The output stage 31 for simplicity is represented as including a low pass filter 32, video amplifier 33 and a utilization device 34.

In the case of phase demodulation operation with a switch 27 in its FM/PM position, the selector switch 30 is thrown to the right hand "PM" position connecting the output circuit 31 to phase detector 26 which compares the limited signal with the phase of a reference crystal oscillator 40 which operates at the second intermediate frequency e.g. 10 megacycles. The output of the phase detector 26 constiuting a varying DC signal proportional to the phase deviation of the incoming signal from the phase reference 40 is applied to the output circuit 31.

In the case of amplitude demodulation operation, the selector switch 27 is moved to the AM position and the second IF frequency is passed through conventional detector 28 and then to video amplifier 33.

In the simple frequency demodulation mode of operation, the limited second IF signal is detected in discriminator 25 and applied through switch 30 in its FM position to the output circuit 31 in conventional manner.

As described thus far, the receiver is a conventional superheterodyne receiver. The first local oscillator 13, the heart of the receiver, however, actually includes three oscillators, the manually tunable variable frequency oscillator 43, a plug in crystal controlled oscillator 50 and a voltage controlled or "pulled" crystal oscillator 51 connected with a phase detector 54 in a phase locked loop configuration. The plug-in crystal oscillator 50 determines the basic frequency $f_1$ which is combined in a mixer 52 with the output of a variable frequency oscillator 43 operating at frequency $f_2$. The difference frequency $f_1-f_2$ is extracted from the mixer 52 output by band pass filter 53 tuned to this difference frequency and applied to a phase detector 54 which compares the phase of the signal $f_1-f_2$ with reference frequency $f_3$ from the voltage controlled crystal oscillator 51. In the narrow band crystal controlled mode, the control input to the voltage control crystal oscillator is grounded via switch 44 and the oscillator 51 acts as a conventional fixed crystal oscillator. The varying DC output of the phase detector 54 is passed through a band pass filter 55 and in conventional phase locked loop manner is applied through a selector switch 56 to the variable frequency oscillator 43. When the selector switch 56 is in the (APC/XTAL) position, the variable frequency oscillator 43 is phase locked to the voltage control crystal oscillator 51 with frequency and phase stability approximately equaling the combined stabilities of the crystal oscillators 50, 20 and 40.

This receiver is described above in its narrow band crystal controlled mode of operation. However, by operation of the selector switches 27, 30, 44 and 56, the receiver will operate in all of the different modes as listed below with the switch positions noted.

| Operating Mode | Selector Switch Position 27 | 30 | 44 | 56 |
|---|---|---|---|---|
| Crystal Controlled | | | | |
| Amplitude Modulation | AM | --------- | VFO/XTAL | APC/XTAL |
| With APC Short Loop | AM | --------- | VFO/XTAL | APC/XTAL |
| With APC Long Loop | AM | --------- | LL APC | APC/XTAL |
| Frequency Modulation | PM/FM | FM | VFO/XTAL | APC/XTAL |
| With APC | PM/FM | FM | VFO/XTAL | AFC |
| Phase Modulation | | | | |
| Short Loop | PM/FM | PM | VFO/XTAL | APC/XTAL |
| Long Loop | PM/FM | PM | LL APC | APC/XTAL |
| Variable Frequency Oscillator Controlled | | | | |
| Amplitude Modulation | AM | --------- | VFO/XTAL | VFO |
| With AFC | AM | --------- | VFO/XTAL | AFC |
| With APC Short Loop | AM | --------- | VFO/XTAL | APC/XTAL |
| With APC Long Loop | AM | --------- | LL APC | APC/XTAL |
| Frequency Modulation | PM/FM | FM | VFO/XTAL | VFO |
| With AFC | PM/FM | FM | VFO/XTAL | AFC |
| Phase Modulation | | | | |
| Short Loop | PM/FM | PM | VFO/XTAL | APC/XTAL |
| Long Loop | PM/FM | PM | LL APC | APC/XTAL |

In the crystal controlled mode of operation described above, the first local oscillator 13 is in effect a composite fixed crystal oscillator. Frequency switching may be accomplished by substitution of different crystals 50, in a conventional manner for crystal controlled receiver operation. The remaining crystal oscillators 20, 40 and 51 need not be changed. For this reason, the crystal oscillator 40 is preferably panel mounted for simple substitution.

Where simple variable frequency oscillator control is desired, the only change which need be made is to move selector switch 56 to the VFO position, grounding the electrical input to the variable frequency oscillator 43 and allowing its control by the knob for manual tuning. The phase lock loop of the first local oscillator 13 is then disabled and the receiver is tunable over the range determined by the particular oscillator 43, and the multiplication factor of multiplier 14 of local oscillator 13. A typical operating frequency for the variable frequency oscillator 43 is 35–50 mc. which in conjunction with frequency multipliers having multiplication factors of, for example 3, 6, 9 and 24, produced tuning ranges of 105–150 mc., 210–300 mc., 315–450 mc. and 840–1200 mc. respectively.

The increased stability of automatic frequency control in the VFO mode is achieved merely by moving selector switch 56 to the AFC position completing the AFC loop from discriminator 25, AFC circuit 29 to the electrical input to the variable frequency oscillator 13.

The full advantage of this invention is achieved in the automatic phase control mode of operation in which the first local oscillator 13 when operating as a phase lock loop is likewise controlled by a second loop from the phase detector 26. Operating with switches 44 and 56 in the APC positions, the varying DC detected by the phase detector 26 is applied to the frequency controlling input to the voltage control crystal oscillator 51 thereby phase locking the first local oscillator and the first and second IF stages as well to the incoming signal and the reference oscillator 40. This arrangement allows the IF stages to be tuned to narrow bands for maximum gain and noise discrimination without loss of signal due to carrier Doppler shift. The frequency and phase stability of the receiver itself still is a function of the high stability crystal oscillators.

It may, therefore, be seen that in the use of this invention, the prime advantages of variable frequency, crystal controlled and phase lock loop receivers are all achieved in a single receiver. All frequency determining subcircuits are either crystal oscillators or crystal controlled in all except the manual VFO mode. Although four crystal oscillators are used, the substitution of a single crystal 50 will shift the entire operating range of the receiver. This single substitution design minimizes the problem of crystal matching common to multiple crystal circuit designs. Alternately or additionally the operating range of the receiver may likewise be changed by the single substitution of different multipliers 14. Again, no matching problem exists.

The selection of operating modes is accomplished merely by the straightforward operation of the required combination of selector switches 27, 30, 44 and 56.

The simplicity, stability and versatility of this invention are all achieved using standard and well known components well known in the art. The only components of less general knowledge in this inventive combination are the manually and electrically controlled variable frequency oscillator 43 and the voltage controlled crystal oscillator 51. The former is a conventional inductance-capacitance type oscillator using voltage variable capacitors such as the "Varicap" produced by the TRW Electronics Division of Thompson-Ramo-Wooldridge Inc. The voltage controlled crystal oscillator is a conventional crystal oscillator using a crystal such as a ML–18 type Midland Manufacturing Company quartz crystal which exhibits the property of limited range linear shift in frequency as a function of applied potential.

The above description and accompanying drawing illustrate, by a single embodiment, the principles of this invention and are not to be considered as constituting the only embodiment. It is recognized that one skilled in the art can depart from the particular embodiment in details and implementation without departing from the spirit and scope of my invention. Therefore, the exclusive right afforded under the U.S. patent laws shall instead be defined by the definition of my invention as set forth in the following claims and their equivalents.

What is claimed is:

1. In a superheterodyne radio receiver including a local oscillator, a mixer for combining an incoming signal with the output of the local oscillator, and an intermediate frequency stage;

the improvement wherein the local oscillator comprises a voltage controlled variable frequency oscillator and a crystal controlled oscillator in phase locked loop configuration including a phase detector connected to compare the phase of the output of the voltage controlled variable frequency oscillator and the crystal controlled oscillator and including means for deriving a voltage related to the phase deviation of the said oscillators and for applying the derived voltage to the voltage control input of the voltage control variable frequency oscillator to lock the voltage control variable frequency oscillator into phase locked relationship with the crystal controlled oscillator, wherein the crystal controlled oscillator includes a voltage controlled variable frequency crystal oscillator, and the receiver includes means for deriving a control voltage for the voltage controlled crystal oscillator from the output of the intermediate frequency stage.

2. The combination in accordance with claim 1 wherein said last means includes a phase reference source and a phase detector with the phase detector constituting the control voltage source for the voltage controlled crystal oscillator.

3. In a superheterodyne radio receiver including:

a first local oscillator, first means for mixing an incoming signal with the output of the first local oscillator to produce a first intermediate frequency signal, a crystal controlled second local oscillator, second means for mixing the first intermediate frequency with the output of the second local oscillator to produce a second intermediate frequency signal, means for demodulating the second intermediate frequency to derive the intelligence from the incoming signal;

the improvement in which the first local oscillator comprises:

a variable frequency oscillator controllable by separate manual and electrical means and connected to the first mixing means;

a crystal oscillator;

a means including a phase detector connecting the variable frequency oscillator and crystal oscillator in a phase locked loop configuration in which the variable frequency oscillator and crystal oscillator are connected to the phase detector which develops a voltage related to the phase deviation of said oscillators and is connected to apply the developed voltage to the variable frequency oscillator to provide a phase deviation correcting input to the variable frequency oscillator whereby the first local oscillator is locked in phase and frequency to the crystal oscillator;

wherein, the crystal controlled oscillator of the first local oscillator exhibits the property of varying in frequency as a function of an applied voltage, and the receiver includes means for deriving a control voltage representing the phase deviation of the intermediate frequency signal from a phase reference wherein the control voltage is applied to vary the frequency of the voltage controlled crystal oscillator and thereby phase lock the receiver to the incoming signal.

4. The combination in accordance with claim 3 wherein the control voltage deriving means includes a phase reference source and a phase detector connected to the phase reference source and the intermediate frequency stage.

References Cited

UNITED STATES PATENTS

| | | | |
|---|---|---|---|
| 2,719,231 | 9/1955 | Hugenholtz | 325—421 XR |
| 2,808,509 | 10/1957 | Felch et al. | 325—421 XR |
| 3,100,871 | 8/1963 | Richardson et al. | 325—50 XR |
| 3,275,940 | 9/1966 | Kahn | 325—423 |

WILLIAM C. COOPER, Primary Examiner